United States Patent [19]

Deville

[11] 4,058,848

[45] Nov. 15, 1977

[54] CUT-OFF CHAMBER OF A LIGHTNING PROTECTOR

[75] Inventor: Robert Deville, Lyon, France

[73] Assignee: Delle-Alsthom, Villeurbanne, France

[21] Appl. No.: 657,333

[22] Filed: Feb. 11, 1976

[30] Foreign Application Priority Data

Feb. 11, 1975 France ................................ 75.04201

[51] Int. Cl.$^2$ ................................................ H02H 3/22

[52] U.S. Cl. .................................... 361/128; 174/209; 361/129; 313/257

[58] Field of Search ....................... 317/67, 68, 69, 70, 317/61; 315/36; 313/259, 257, 258, 221, 238; 174/140 R, 209; 361/117, 126, 127, 128, 130

[56] References Cited

U.S. PATENT DOCUMENTS

| | | | |
|---|---|---|---|
| 1,308,871 | 7/1919 | Schmidt | 174/209 X |
| 3,118,968 | 1/1964 | Moussou | 174/209 X |
| 3,691,512 | 9/1972 | Exner | 174/209 X |
| 3,812,284 | 5/1974 | Pohl | 174/140 R X |

FOREIGN PATENT DOCUMENTS

| | | | |
|---|---|---|---|
| 478,170 | 1/1938 | United Kingdom | 174/178 |

*Primary Examiner*—J D Miller

*Assistant Examiner*—Patrick R. Salce

*Attorney, Agent, or Firm*—Sughrue, Rothwell, Mion, Zinn and Macpeak

[57] ABSTRACT

Cut-off chamber of a lightning protector, characterized in that on the one hand, it comprises a wall made of a porous ceramic substance, ensuring the discharge and the cooling of the gases at the periphery of the chamber, at the time of the ignition of an arc between two electrodes combined in that chamber and that on the other hand, a means for reinforcing the dielectric strength of the wall is arranged perpendicular to the zones subjected to the highest potential gradients.

15 Claims, 3 Drawing Figures

CUT-OFF CHAMBER OF A LIGHTNING PROTECTOR

The invention relates to cut-off chambers for lightning protectors in which the arc due to the follow current gives rise to a relatively high arc voltage and, more particularly, cut-off chambers for magnetic blow-out lightning protectors. The walls of these chambers are generally made of either a glass-mica compound or a porous ceramic substance.

When the walls of the chambers are made of a glass-mica compound, it is necessary to provide one or several orifices enabling the relieving of the over-pressure which occurs at the time of the ignition of the spark gaps arranged inside the chambers, for that over-pressure is antagonistic to a rapid lengthening of the arc under the effect of the magnetic field. One disadvantage of that technique is the following: the cooling of the ionized gases produced by the arc is often insufficient when these gases reach the outside of the chambers and flashing over can result therefrom.

When the walls of the chambers are made of porous ceramic substances, the above disadvantage disappears, but the low dielectric strength of that substance requires a great increase in the thickness of the walls of the chambers to avoid a perforation through the insulant between two neighbouring spark gaps subjected to a high dielectric stress. That increase in the thickness of the wall increases the bulk of the spark gaps and of the casing as well as the price of the equipment.

The object of the invention is a cut-off chamber whose walls provide simultaneously, with a minimum bulk, sufficient cooling at the time of the ignition of an arc and sufficient dielectric strength of the zones subjected to a high dielectric stress.

The invention has as its object a cut-off chamber which contains electrodes in a central region and which is limited by a wall made, at least in the peripheral region, of a porous ceramic substance ensuring the discharge and the cooling of the gases at the periphery of the chamber at the time of the ignition of an arc between the said electrodes, characterized by the inserting, in the central region of that wall, of a substance having a greater dielectric strength.

According to one characteristic of the invention, that substance having greater dielectric strength is inserted by impregnation, in the zones subjected to the highest potential gradients, of the wall entirely made of a porous substance.

According to another characteristic of the invention, that substance having greater dielectric strength constitutes the central region of the wall through all its thickness.

According to another characteristic of the invention, that substance having greater dielectric strength forms a part of the thickness of the wall in the central region of the latter, the remainder of the thickness being constituted therein by the same porous substance as that of the peripheral region.

The characteristics and advantages of the invention will become apparent from the various examples of embodiment of the invention given by way of illustration in the accompanying drawings.

Figure 1:
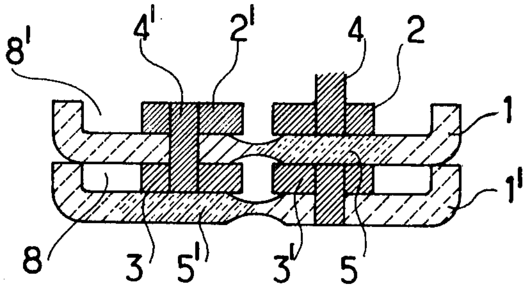
FIG. 1 is a cross-section view of a cut-off chamber of a lightning protector according to the invention, the lightning protector being formed by a stack of such chambers.

In the figures, the insulating walls or disks of cut-off chambers 8 and 8' have been designated by 1 and 1'. Those walls or disks are made of a ceramic substance whose porosity enables simultaneously the relieving of the over-pressures produced by the arc and the cooling of the ionized gases, but whose dielectric strength is insufficient for maintaining the voltage between the electrodes of the spark gaps of neighbouring chambers. The electrodes 2 and 2', 3 and 3' are fixed in the central region of the insulating walls for example by rivets 4 and 4' so as to provide a sparking distance between the electrodes 2 and 2' on the one hand and 3 and 3' on the other hand. As shown in FIG. 1, the gradient applied to the porous ceramic substance 1 between the electrodes 2 and 3' can be great and exceed the break gradient of that substance.

According to the invention and according to FIG. 1, the shaded zones 5, 5', of the insulating walls 1 and 1' of the cut-off chambers, which are subjected to a high gradient, are impregnated with a product greatly increasing the dielectric strength such as, for example, an enamel, a nonporous ceramic substance, or a fusible silicate. After local impregnation, the insulating walls 1, 1' are baked at a temperature which depends on the quality of the impregnation product and which is generally higher than 800° C. Impregnation can also be effected without a great increase in temperature by means of a synthetic resin, such as, for example, an epoxyde resin, a polyester resin or a silicone resin. That arrangement locally increases, at 5 and 5', the dielectric strength, while practically cancelling the porosity in that zone, but makes it possible to maintain a sufficient porosity in the remaining zones of the insulating walls 1 and 1', which are not shaded.

Figure 2:
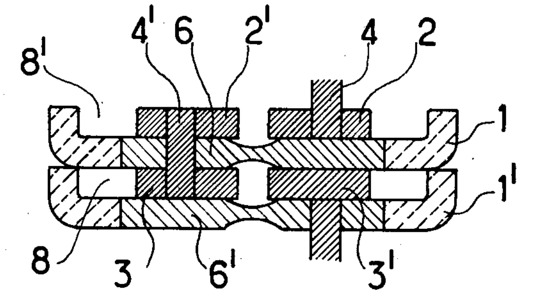
FIGS. 2 and 3 are views of variants of cut-off chambers of a lightning protector according to the invention.

According to FIG. 2, the central region of the insulating walls 1 and 1' made of a porous ceramic substance including zones 5 and 5', is replaced by parts 6 and 6' made of a substance having high dielectric strength, for example a glass-mica compound or a non-porous ceramic substance. Assembling can be effected by cementing. It is also possible to assemble the parts 1 and 1' and the parts 6 and 6' in FIG. 2 before baking and to bake the assembly thus obtained subsequently. The parts 6 and 6' can correspond only to the central zone of the walls 1 and 1', as shown in FIG. 2, but it is also possible for the parts 6 and 6' to correspond to all the planar part of the insulating walls of the cut-off chambers and to make only the cylindrical parts constituting the peripheral surface or rim of the cut-off chambers or, even, in particular cases, only a part of the latter, with a porous ceramic substance.

Figure 3:
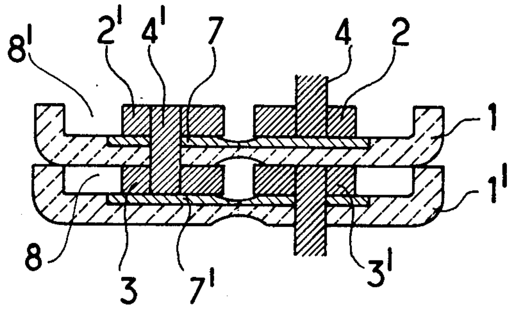

According to FIG. 3, recesses 7 and 7' are formed in the plane area of the insulating walls 1 and 1' made of a porous ceramic substance, then these recesses are filled with a substance having high dielectric strength. That filling can be effected in several ways, for example:

Filling with a non-porous ceramic substance before baking. After the filling, the assembly is baked at the temperature corresponding to the quality of the component substance of the walls 1, 1' on the one hand and of the substance filling the recesses 7, 7' on the other hand;

Filling with enamel or fusible silicate effected after a first baking of the porous ceramic substance. The assembly then undergoes a second baking at a lower temperature than that of the first baking;

Cementing, in the recesses 7, 7', of a non-porous ceramic substance which has been manufactured separately.

It is quite evident that the invention is in no way limited to the embodiments which have just been described and illustrated and which have been given only by way of an example. More particularly, without going beyond the scope of the invention, certain arrangements can be modified or certain means can be replaced by other equivalent means.

What is claimed is:

1. Cut-off chamber defined by two adjacent walls having a periphery, a central region, electrodes located in said central region, and zones of high potential gradients around said electrodes, characterized in that said walls are made of a porous ceramic material ensuring the discharge and the cooling of the gases at the periphery of the chamber at the time of the flash of an arc between said electrodes, said porous ceramic material comprising a substance of higher dielectric strength at said zones than at the periphery of said walls.

2. Cut-off chamber according to claim 1, characterized in that the substance having greater dielectric strength is locally inserted by impregnation in the zones.

3. Cut-off chamber according to claim 2, characterized in that the impregnation is effected by means of a substance, such as an enamel, a non-porous ceramic substance, a and fusible silicate, baked at a temperature at least equal to 800° C.

4. Cut-off chamber according to claim 2, characterized in that the substance is an epoxyde, polyester or silicon resin.

5. Cut-off chamber according to claim 1, characterized in that the substance having greater dielectric strength is inserted in recesses provided in the central region of the wall, the remainder of the thickness being constituted therein by the same porous ceramic substance as that of the periphery.

6. Cut-off chamber according to claim 5, characterized in that the substance having greater dielectric strength constitutes a disk arranged in a said recess of the wall.

7. Cut-off chamber according to claim 1 characterized in that the substance having greater dielectric strength is a glass-silica compound or a non-porous ceramic substance.

8. Cut-off chamber according to claim 7, characterized in that the substance having the greatest dielectric strength is to cemented to the adjacent porous ceramic substance.

9. Cut-off chamber according to claim 7, characterized in that the substance having greater dielectric strength and the adjacent porous ceramic substance are assembled when cold and that the assembly then undergoes baking.

10. Cut-off chamber according to claim 9, characterized in that the substance having greater dielectric strength is constituted by parts including the whole central region of the wall through all its thickness.

11. In a blow-out lightning protector of the type including a stack of chambers formed by a stack of insulating disks of porous ceramic material, each disk having a planar wall perpendicular to the longitudinal axis of the stack and a peripheral upstanding rim so that the rims act as spacers to form the stack of chambers, each chamber containing a pair of separated electrodes for supporting an arc therebetween and spaced inwardly from the rim, the porosity of the ceramic material being sufficient to pass and cool gases formed upon the occurrence of an arc between the electrodes, and wherein very high potential gradients occur in a zone of the planar wall between electrodes which are in adjacent chambers and which are on opposite sides of the wall, the improvement wherein said zone of very high potential gradients comprises a non-porous material of higher dielectric strength than said porous ceramic material, thereby preventing electrical breakdown of said zone while simultaneously permitting discharge and cooling of gases by the remainder of the disk not included in said zone.

12. The improvement of claim 11 wherein said non-porous material of higher dielectric strength is an impregnant which is impregnated in the porous ceramic material of said zone.

13. The improvement of claim 11 wherein said zone of the planar wall is cut out and replaced by a section of said non-porous material.

14. The improvement of claim 11 wherein the planar wall contains a recess including said zone, wherein said non-porous material fills said recess.

15. The improvement of claim 11 wherein said zone includes the entire planar wall, so that only the rim of a disk is porous to the gases.

* * * * *